Patented Aug. 24, 1926.

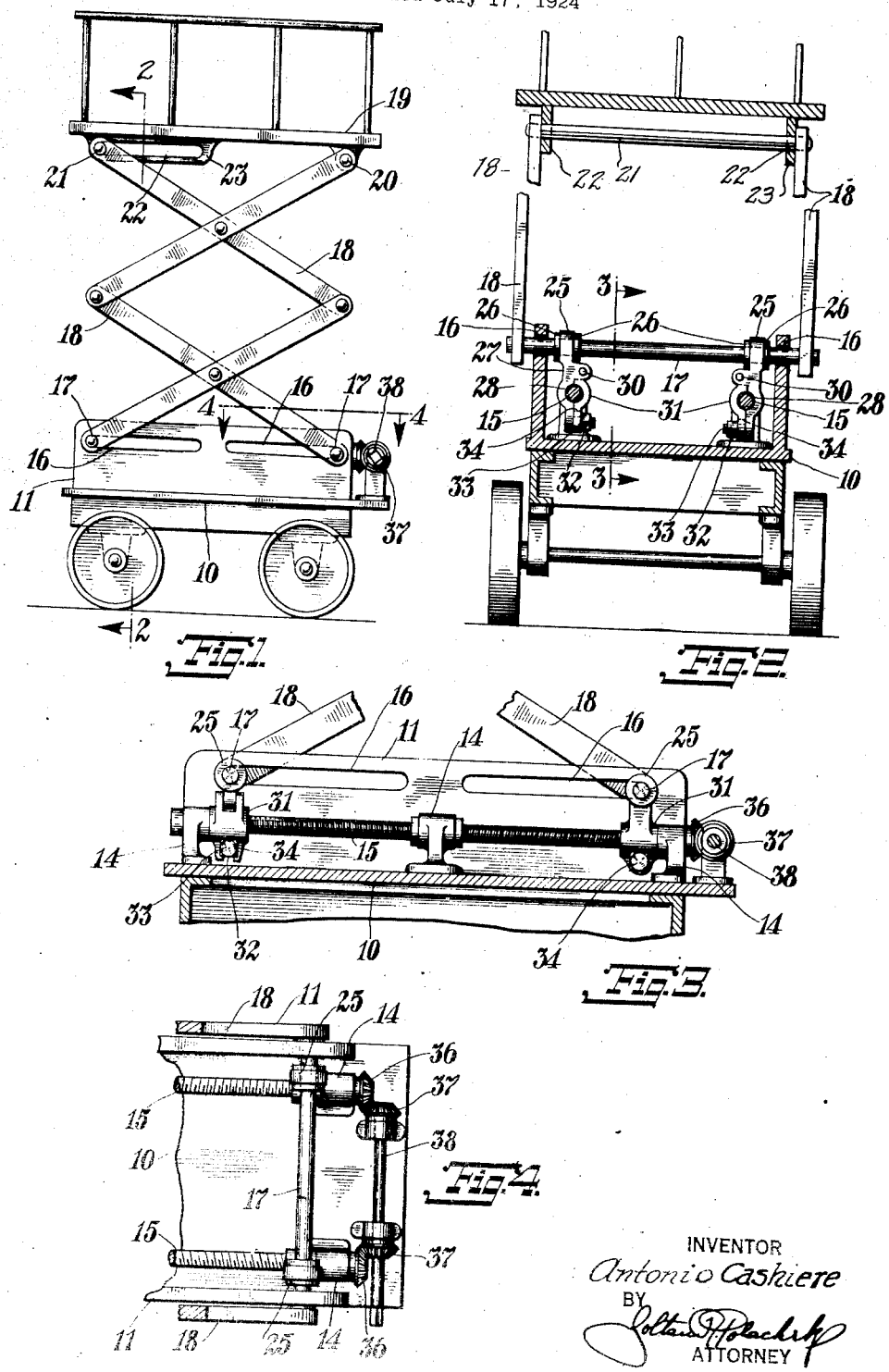

1,597,265

UNITED STATES PATENT OFFICE.

ANTONIO CASHIERE, OF BLAIRSVILLE, PENNSYLVANIA.

ADJUSTABLE PLATFORM FOR FIRE APPARATUS.

Application filed July 17, 1924. Serial No. 726,468.

This invention relates to a truck provided with a vertically adjustable platform, and it may be embodied in trucks for use as fire apparatus, or such as are employed by traction companies in repairing and stringing trolley wires.

The invention has for an object the provision of a novel and improved device of this sort, the platform whereof may be raised to considerable heights, and readily collapsed close to the body of the wagon or truck.

For further comprehension of the invention, and of the objects and advantages thereof, reference will be had to the following description and accompanying drawing, and to the appended claim in which the various novel features of the invention are more particularly set forth.

Fig. 1 of the drawing is a side view of a truck having the invention applied thereto.

Fig. 2 is a detail transverse sectional view taken on the line 2—2 of Fig. 1.

Fig. 3 is a detail longitudinal sectional view taken on the line 3—3 of Fig. 2.

Fig. 4 is a fragmentary horizontal sectional view taken on the line 4—4 of Fig. 1.

In the drawing the reference numeral 10 indicates generally a truck floor which is supported on any ordinary chassis. Extending along opposite sides of this floor are the wall members 11. Mounted on the floor are a number of bearing elements 14 which support two longitudinal screw shafts 15 threaded in opposite directions, there being one of these shafts adjacent each wall 11. Each shaft is formed with right and left hand screw threads. Formed in each of the wall members are the alined longitudinal slots 16 through which extend the ends of the crossbars 17, there being a pair of these bars, one near the front end and one near the rear end of the truck. These bars 17 are movable transversely of themselves and longitudinally of the truck. These bars 17 have attached to their ends the lower ends of the vertically positioned lazy-tong structures 18 which have a platform 19 mounted on their upper ends, one top bar of each structure being pivoted as at 20 to the platform, while the other top bars of the two structures are united by a crossbar 21 that extends transversely under the platform and passes freely adjacent its ends through longitudinal slots such as 22 in cleats such as 23 on the underside of the platform 19.

To adjust these structures 18, and thereby raise or lower the platform, I provide the following means. Freely surrounding the bars 17 are the eye elements 25 which are held against longitudinal displacement on the bars by the collars 26. These eyes have formed integral therewith the depending brackets 27 provided with semi-circular grooves 28 to receive the shafts 15. Hinged to these brackets as at 30 are the semi-cylindrical nut-sections 31 which engage the threads of the shafts and which are retained in normal operative position by means of the nuts 32 threaded on screws 33 fixed to the brackets, these screws passing through slots 34 in the nut-sections 31. Each shaft 15 has fixed on one end thereof a bevel gear 36 which meshes with a like gear 37 on a transverse shaft 38 which may be formed with a square end to receive a handle for rotation purposes, or may be connected with the motor of the truck for rotation.

Normally, when shaft 38 is rotated, the two bars 17 travel over the truck toward one another and so raise the platform upward. If it is desired to project the platform longitudinally in one direction or the other while being raised the proper nut-sections 31 may be loosened, allowing the shafts 15 to rotate without having any effect on the adjacent bar 17, while the other bar is moved along the truck to raise the platform, the ends of the slots 16 forming abutments for the first named bar during this movement.

Having thus described my invention what I claim as new and desire to protect by Letters Patent of the United States is as follows:—

The combination in a device of the class described having screw shafts for the operative means, and cross bars disposed in slots operating a lazy tong structure, of depending brackets provided with eye elements engaging said cross bars held in position by collars, and said brackets provided with semi-circular grooves receiving said screw shafts, semi-cylindrical nut sections hinged to said brackets co-acting with the semi-circular grooves and meshing with said screw shafts, and clamping means between said hinged sections and brackets.

In testimony whereof I have affixed my signature.

TONY CASHIERE.